(12) United States Patent
Pletz et al.

(10) Patent No.: US 9,650,113 B2
(45) Date of Patent: May 16, 2017

(54) CARGO TRANSPORTER LOADING ASSEMBLY

(71) Applicant: SANDVIK INTELLECTUAL PROPERTY AB, Sandviken (SE)

(72) Inventors: Rudolf Pletz, Eppenstein (AT); Joachim Vorauer, Graz (AT); Frank Hochegger, Vancouver (CA)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/775,958

(22) PCT Filed: Mar. 14, 2014

(86) PCT No.: PCT/EP2014/055145
§ 371 (c)(1),
(2) Date: Sep. 14, 2015

(87) PCT Pub. No.: WO2014/140302
PCT Pub. Date: Sep. 18, 2014

(65) Prior Publication Data
US 2016/0023723 A1    Jan. 28, 2016

Related U.S. Application Data

(60) Provisional application No. 61/800,766, filed on Mar. 15, 2013.

(51) Int. Cl.
| | |
|---|---|
| *B65G 67/60* | (2006.01) |
| *B63B 19/14* | (2006.01) |
| *B65G 21/08* | (2006.01) |
| *B65G 69/00* | (2006.01) |

(Continued)

(52) U.S. Cl.
CPC ............ *B63B 27/28* (2013.01); *B65G 67/606* (2013.01); *B66C 19/00* (2013.01)

(58) Field of Classification Search
CPC ..... B65G 69/181; B65G 67/606; B65G 21/08
USPC .................. 114/361; 135/90; 141/97; 193/3; 198/550.2, 560, 563, 580, 588, 589, 595, 198/812, 860.5; 212/260, 300; 414/137.4, 140.2, 140.5, 140.8, 140.9, 414/141.8, 142.1, 142.2, 142.3, 143.1
See application file for complete search history.

(56) References Cited

U.S. PATENT DOCUMENTS

| | | | | |
|---|---|---|---|---|
| 451,903 | A | * | 5/1891 | Walsh ..................... B63B 27/00 135/90 |
| 524,137 | A | * | 8/1894 | Enright ................. B63B 17/023 114/361 |

(Continued)

FOREIGN PATENT DOCUMENTS

| | | | |
|---|---|---|---|
| CA | 2699009 | A1 * | 10/2010 |
| CA | 2845240 | A1 | 2/2013 |

(Continued)

*Primary Examiner* — Gregory Adams
(74) *Attorney, Agent, or Firm* — Corinne R. Groski

(57) ABSTRACT

A cargo transporter loading assembly for loading bulk material onto a cargo transporter. The assembly includes a frame carrying a pivotally mounted boom. A distal end of the boom carries a head part encased by a cover and configured to prevent wind and rain ingress into the region between the boom and a cargo hold of a cargo transporter during bulk material loading.

21 Claims, 17 Drawing Sheets

(51) Int. Cl.
 *B63B 27/28* (2006.01)
 *B66C 19/00* (2006.01)

(56) References Cited

U.S. PATENT DOCUMENTS

| | | | | |
|---|---|---|---|---|
| 1,010,767 | A * | 12/1911 | Hulett | B65G 69/00 193/3 |
| 2,644,574 | A * | 7/1953 | Mercier | B65G 21/08 135/132 |
| 2,887,235 | A * | 5/1959 | Ladner | B66C 7/00 212/204 |
| 3,198,353 | A * | 8/1965 | McDowell | B65G 63/008 198/580 |
| 3,286,818 | A * | 11/1966 | Ross | B65G 69/181 198/585 |
| 3,388,818 | A | 6/1968 | Friel | |
| 3,738,464 | A * | 6/1973 | Ortlip | B65G 69/181 141/284 |
| 4,065,002 | A | 12/1977 | Cunningham et al. | |
| 4,125,195 | A * | 11/1978 | Sasadi | B65G 11/126 141/284 |
| 4,277,214 | A * | 7/1981 | Mahle | B65G 11/146 193/16 |
| 4,658,948 | A * | 4/1987 | Miller | B65G 53/48 198/364 |
| 4,957,198 | A * | 9/1990 | Miller | B65G 53/48 198/513 |
| 5,193,965 | A | 3/1993 | Soros | |
| 5,427,491 | A * | 6/1995 | Duffy | B65G 69/181 406/171 |
| 6,068,435 | A * | 5/2000 | Borjesson | B65G 67/603 212/325 |
| 6,896,123 | B1 * | 5/2005 | Horak | B65G 21/08 198/595 |
| 2007/0217895 | A1 | 9/2007 | Igel | |

FOREIGN PATENT DOCUMENTS

| | | | |
|---|---|---|---|
| CA | 2799118 A1 * | 6/2014 | ............ B32B 27/22 |
| DE | 19505372 A1 | 8/1996 | |
| DE | 10226050 C1 | 10/2003 | |
| DE | 102004054415 A1 | 5/2006 | |
| GB | 1536303 A | 12/1978 | |
| GB | 2265135 A | 9/1993 | |
| JP | S57126329 A | 8/1982 | |
| JP | 03061293 A * | 3/1991 | |
| JP | 10212033 A * | 8/1998 | |
| WO | 00/19245 A1 | 4/2000 | |
| WO | 2005123494 A1 | 12/2005 | |

\* cited by examiner

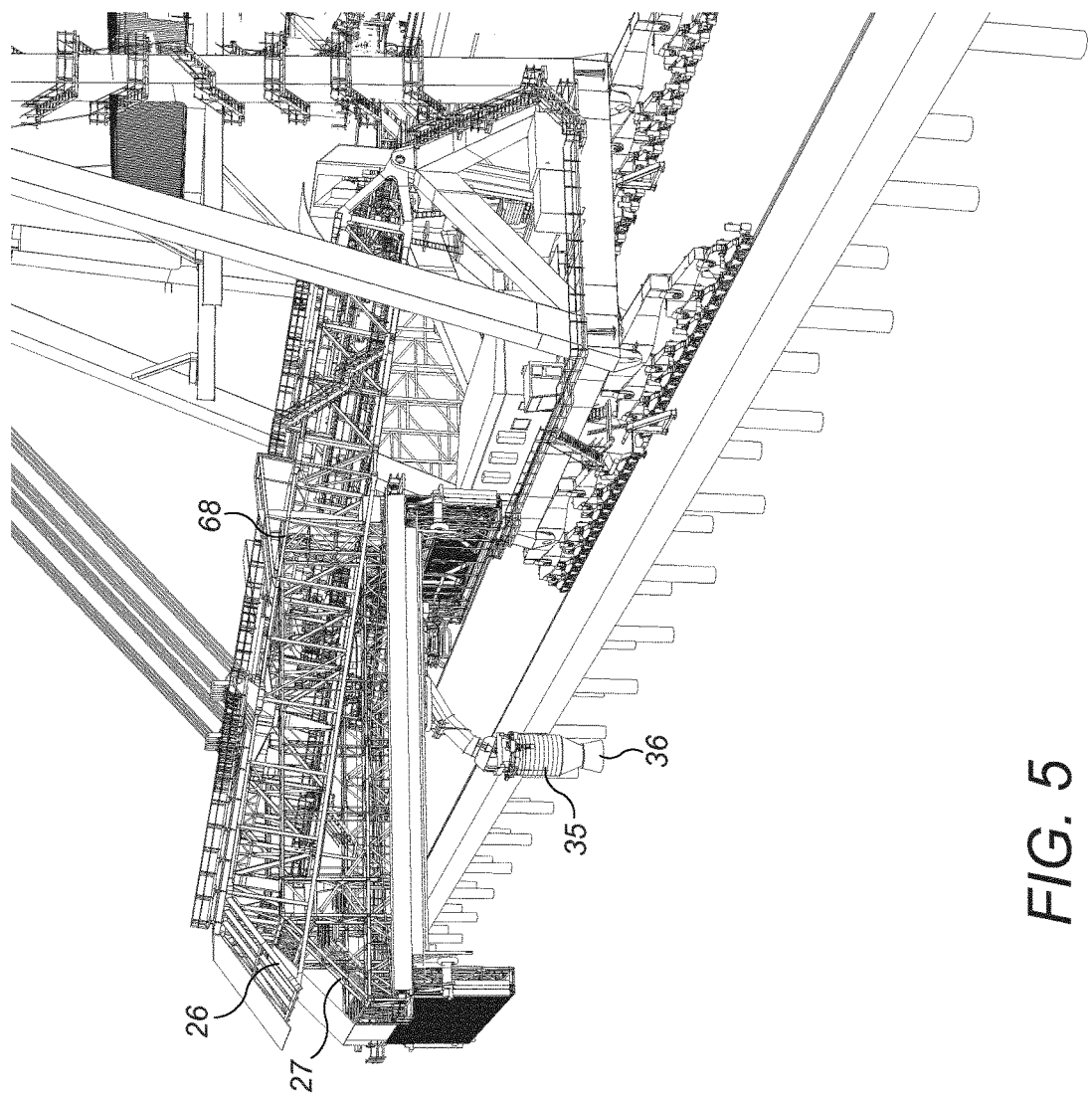
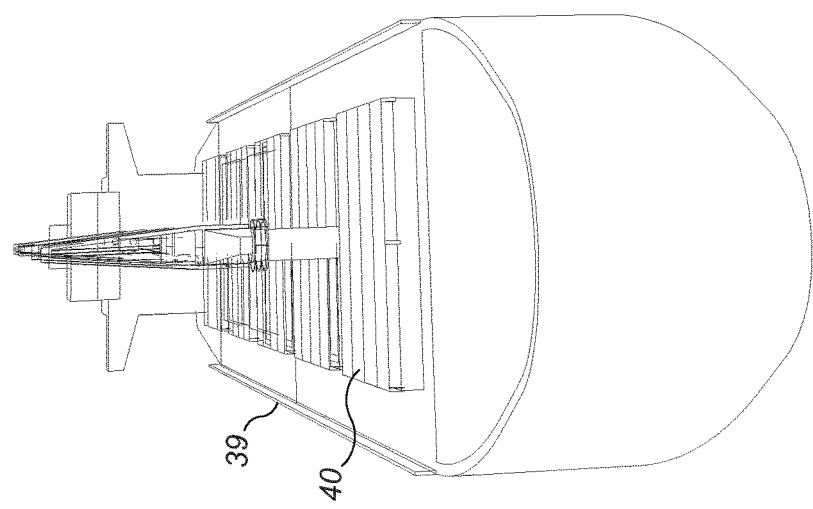
FIG. 5

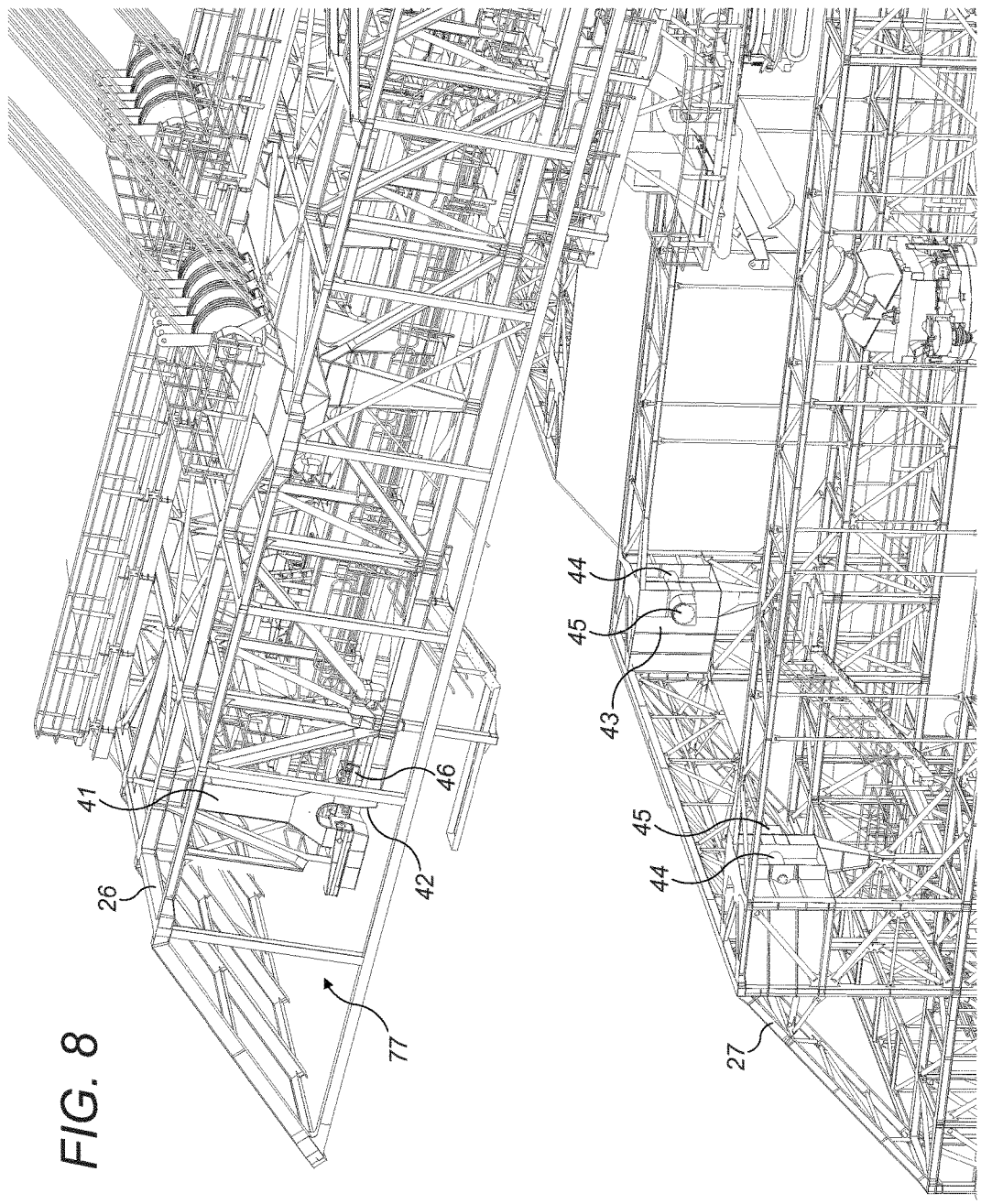

CARGO TRANSPORTER LOADING ASSEMBLY

RELATED APPLICATION DATA

This application is a §371 National Stage Application of PCT International Application No. PCT/EP2014/055145 filed Mar. 14, 2014 claiming priority of U.S. Provisional Patent Application No. 61/800,766, filed Mar. 15, 2013.

FIELD OF INVENTION

The present invention relates to a cargo transporter loading assembly for loading bulk material into a cargo transporter and in particular, although not exclusively, to a ship loader assembly.

BACKGROUND ART

It is common practice and procedure to avoid loading moisture-sensitive materials onto cargo ships during inclement weather such as rain and wind egress as they may become water damaged or displaced. Moisture sensitive materials include, but are not limited to, bulk foods such as grain and rice and other materials such as pot ash and fertilizers. Further, the inability to load these materials during inclement weather causes delays in shipping the materials to their intended destination.

Example ship loading systems with conventional loading assemblies are described in U.S. Pat. No. 3,388,818A; U.S. Pat. No. 4,065,002A; GB 1536303A; U.S. Pat. No. 5,193,965A; EP 980328B1; WO 2005/123494A1; US 2007/0217895A1.

Accordingly, what is required is a ship loading arrangement that addresses the above problems.

SUMMARY OF THE INVENTION

It is an objective of the present invention to provide a bulk material loading assembly to allow the transfer of moisture-sensitive materials and other fine grade materials into cargo transporters such as ships without interruption by inclement weather and in particular precipitation and wind ingress at the region where the bulk material is transferred into the cargo transporter.

The objectives are achieved by providing a bulk material loading assembly in which a cover arrangement is specifically adapted at a distal end of an elongate boom to enclose the region at which the bulk material is discharged into the cargo transporter so as to prevent rain and wind ingress that may otherwise disrupt the transfer of the material. Advantageously, the present cover arrangement may be considered to be divided to comprise a fixed part extending over a distal end of the boom and a moving part that is suspended below the distal end and is capable of pivoting so as to be movable to adjust the position of a lower region of the cover to mate against an upper region of a cargo hold part of the cargo transporter to ensure an effective enclosure is created around the region of transfer of the material from the boom to the cargo transporter. In particular, a head part of the assembly is suspended via a pivot arrangement so as to be capable of rocking back and forth about the pivot to maintain a substantially horizontal alignment of the head part being angularly disposed relative to the boom. Accordingly, the present arrangement is advantageous such that the lower region of the cover provided at the head part may be maintained in a substantially horizontal arrangement when the boom is orientated in an inclined or a declined position relative to the support frame.

According to a first aspect of the present invention there is provided a cargo transporter loading assembly for loading bulk material onto a cargo transporter, the assembly comprising: an upstanding support frame mountable on land or a support structure; a boom pivotally mounted and projecting outwardly from the frame, the boom having a proximal end positioned at the frame and a distal end capable of being raised and lowered relative to the frame; a chute arrangement to transport the bulk material along the boom to the distal end; characterised in that: the distal end comprises a first cover extending over the distal end; and the assembly comprises a pivoting head part pivotally attached to be suspended below the distal end having a second cover to form a downward extension of the first cover for positioning immediately above the cargo transporter to be loaded with the bulk material; wherein the head part is capable of pivoting below the distal end and being maintained at an angled orientation relative to the boom.

Reference within the specification to a cargo transporter includes a container, a loading platform, a ship, a vessel, a vehicle, a lorry, a train carriage or cart and the like.

Preferably, the cover at the boom distal end extends over an upper region of the boom and sides of the boom. Advantageously, the first cover and second cover collectively form a shield to prevent rain and wind ingress into the region immediately below the boom distal end. Reference within this specification to a 'downward extension' is not restricted to a particular planar or parallel alignment of the first and second covers and encompasses all configurations where the first and second covers are positioned close to one another in touching or near touching contact to function as a unitary shield to cover the distal end and the head part.

Optionally, the assembly further comprises a front wall projecting downwardly from the head part at a location furthest from the frame relative to a back wall projecting downwardly from the head part at a spaced apart location from the front wall. The front and back walls are advantageous to provide a rigid or fixed structure for positioning in close proximity to the cargo transporter to be loaded to provide an effective shield against water or wind ingress.

Optionally, the assembly further comprises at least one flexible curtain positioned to be lowerable to extend between the front and back wall. Preferably, the assembly comprises a pair of flexible curtains, each curtain positioned to be capable of projecting downwardly from the head part to extend between the front and back wall such that the front wall, the back wall and the curtains define an enclosed region below the head part. The flexible curtains are advantageous to provide flexibility of the configuration of the lower mating region of the head part so as to fit closely against different configurations of cargo transporter hold. For example, the curtains may be configured to extend fully downwardly or only partially downwardly relative to the front and back walls. The flexible curtains are also advantageous to allow visual inspection into the cargo hold if required.

Preferably, the front and back wall comprise respective pairs of retractable wings to extend towards and away from the curtains and laterally outward from the front and back walls. The wings when extended, are configured to sit against the curtains to substantially close or seal the enclosed region below the head part.

Optionally, the front and/or back wall are movably mounted at the head part. Optionally, the front and back wall are substantially rigidly mounted at the head part.

Preferably, the assembly comprises at least one curtain drive mechanism to actuate raising and lowering of the curtains to project downwardly from the head part. Advantageously, the assembly comprises a plurality of curtain drive mechanisms associated with each curtain. According to the preferred implementation, the curtain drive mechanisms comprise rotationally driven spools over which the curtains are wound such that the spools may wind or unwind to both raise and lower the curtains.

Preferably, the assembly further comprises a mounting assembly to pivotally mount the head part at the distal end. Optionally, the mounting assembly comprises at least one mounting pin connecting the distal end of the boom and the head part. In particular, the mounting assembly may further comprise at least one mount frame having at least one slot provided at the distal end; at least one wedge movably mounted via at least one actuator to open and close the at least one slot; wherein the at least one mounting pin is provided at the head part and is capable of being releasably engaged within the at least one slot and locked by the at least one wedge. Such an arrangement is advantageous to provide reliable but convenient attachment and detachment of the head part at the boom without the need for any or excessive manual intervention. The head part according to the subject invention may be conveniently and quickly detached and recoupled at the boom. Such an arrangement is advantageous to allow different head part configurations to be attached to the boom to suits different cargo transporters and cargo hold arrangements.

Advantageously, the assembly may further comprise a levelling mechanism configured to control an orientation of the head part relative to the boom so as to maintain a desired angle of orientation of the head part relative to the boom. Advantageously, the levelling mechanism is enabled to control the head part to be maintained at a substantially horizontal orientation where the boom is either inclined or declined relative to the horizontal. The head part can therefore mate closely against the cargo transporter and the cargo transporter hold to reliably seal the region of transfer of both material from the assembly to the cargo transporter.

Preferably, the assembly further comprises a loading chute mounted at or towards the boom distal end having a downwardly projecting section through which the bulk material is capable of falling; and a slewing mechanism rotatably mounting an upper region of the loading chute at or towards the distal end to allow the downwardly projecting section to rotate so as to provide adjustment of a position of a lower region of the loading chute to discharge the bulk of material to different locations at the cargo transporter. The slewing mechanism arrangement is advantageous to change the position of the lower region of the chute and to fill the cargo hold in an even and uniform manner during loading. This reduces the need to level the material as it fills the cargo hold and is therefore time efficient and ensures maximum capacity of the cargo hold is achieved via an automatic loading process.

Optionally, the assembly further comprises a translation mechanism mounting the loading chute at or towards the distal end such that the loading chute is capable of moving in a direction along the length of the boom between the proximal and distal ends. Such an arrangement is advantageous to further enhance the positional adjustment of the lower end region of the loading chute to access all regions of the cargo hold of the cargo transporter during material loading.

Optionally, the translation mechanism comprises a rack and pinion arrangement. Alternatively, the translation mechanism may comprise one or a plurality of linear actuators, chains, belts or screw drive arrangements as will be appreciated in the art configured to provide linear movement of the loading chute and optionally the entire slewing mechanism.

Preferably, a region of the funnel section is curved along its length. Such an arrangement is advantageous to improve the 'reach' of the lower end of the funnel to reach the corners of the cargo hold within the cargo transporter.

Preferably, the slewing mechanism comprises an upper shell and a lower shell coupled via an intermediate slew bearing such that the lower shell is capable of slewing relative to the upper shell; and wherein the loading chute is mounted to the lower shell.

Preferably, the upper shell is mounted at the boom via a slewing levelling mechanism configured to maintain at least a region of the slewing mechanism in a substantially horizontal arrangement such that the axis about which the loading chute is capable of slewing is maintained in a substantially vertical alignment.

According to a second aspect of the present invention there is provided a cargo transporter loading assembly for loading bulk material into a cargo transporter, the assembly comprising: an upstanding support frame mountable on land or a support structure; a boom pivotally mounted at and projecting outwardly from the frame, the boom having a proximal end positioned at the frame and a distal end capable of being raised and lowered relative to the frame; a supply chute arrangement to transport bulk material along the boom to the distal end; characterised by: a loading chute mounted at or towards the distal end having a section to project downwardly from the distal end, the loading chute configured to receive material from the supply chute; and a slewing mechanism rotatably mounted the loading chute at or towards the distal end such that the loading chute is capable of slewing about an axis that projects downwardly from the distal end to enable adjustment of a position of a lower region of the loading chute relative to the distal end.

According to a further aspect of the present invention there is provided an all-weather ship loading assembly for loading bulk material onto a ship includes a support frame movably disposed along a linear axis by a travel system; a boom rotatably supported on the frame and extending therefrom, the boom having a fixed section and a luffing part having opposed ends and being rotatably attached to the fixed section; a shuttle chute having opposed ends, the shuttle chute being movably disposed on the luffing part; an adjustable cover system formed on the luffing part to protect an open hatch and hold of the ship from precipitation and wind egress, the cover system including a cover extending over the boom, a front wall located on one end of the luffing part, a flexible curtain disposed on each side of the luffing part, each of the curtains being lowerable to meet with the front wall and fully enclose the luffing part, and a back wall located on the other end of the luffing part; and a loading chute rotatably mounted on one end of the shuttle chute for guiding the bulk material into the hold of the ship.

According to a further aspect of the present invention there is provided a method for loading a ship with bulk material includes providing a support frame; moving the support frame along a linear axis by a travel system; rotatably attaching a boom to the frame, the boom having a fixed section and a luffing part rotatably attached to the fixed section; positioning a cover system formed on the luffing part on an open hold of the ship to protect an open hatch and hold of the ship from precipitation and wind egress, said cover system including a cover extending over the boom, a front wall located on one end of the luffing part, a flexible curtain disposed on each side of the luffing part, each of the curtains being lowerable to meet with the front wall and fully enclose the luffing part, and a back wall located on the other end of the luffing part; moving a shuttle chute along a length of the boom, wherein a loading chute is rotatably mounted on one end of the shuttle chute for guiding the bulk material into the hold of the ship; and delivering the bulk material through the shuttle chute and loading chute.

According to a further aspect of the present invention there is provided a cover system for protecting an open hatch and hold of a ship from precipitation and wind egress includes a boom rotatably supported on a frame, the boom being positionable over the hold of the ship, the boom having opposed ends; a cover disposed on one end of the boom; a front wall located the end of boom; a back wall located at the other end of the boom; and a flexible curtain disposed on each side of the boom, wherein each of the side curtains is lowerable to meet with the front and back walls to fully enclose the hold.

According to a further aspect of the present invention there is provided a spout system for loading a hold of a ship with a bulk material includes a shuttle chute having opposed ends, the shuttle chute being movably with respect to the hold of the ship; a loading chute disposed on one end of the shuttle chute for guiding the bulk material into the hold of the ship, wherein the loading chute is curved to enable all areas of the hull to be reached; and a rotating mechanism connecting the loading chute to the end of the shuttle chute to rotate the loading chute about the shuttle chute.

BRIEF DESCRIPTION OF DRAWINGS

A specific implementation of the present invention will now be described, by way of example only, and with reference to the accompanying drawings in which:

FIG. 5 is a further perspective view of the assembly of FIG. 4 in position to discharge bulk material into a cargo vessel;

FIG. 8 is a further perspective view of the distal end region of the boom of FIG. 1 separated from a head part according to a specific implementation of the present invention;

DETAILED DESCRIPTION OF PREFERRED EMBODIMENT OF THE INVENTION

Figure 1:
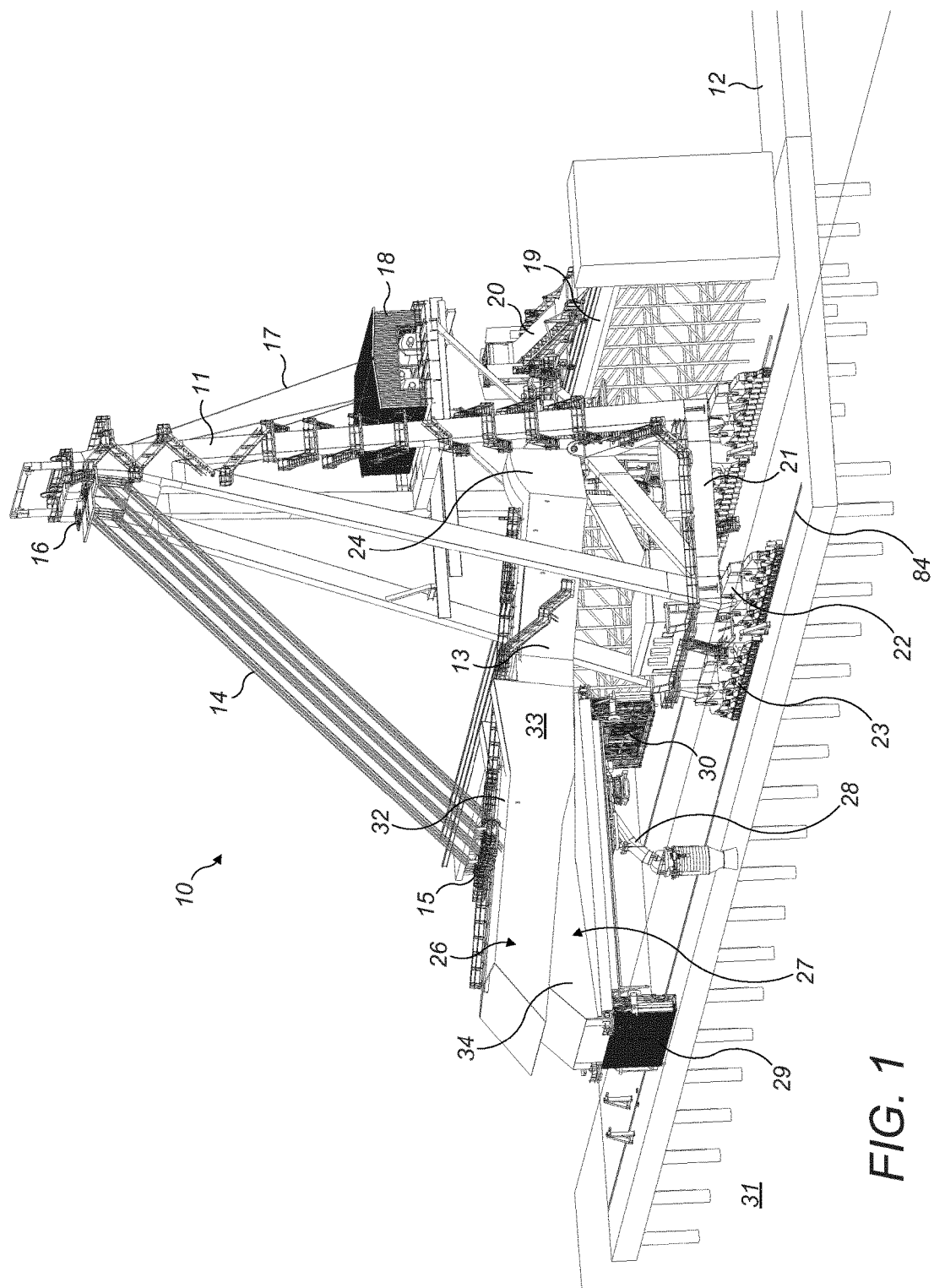
FIG. 1 is a perspective view of the a vessel loading assembly according to a specific implementation of the present invention.
Figure 2:
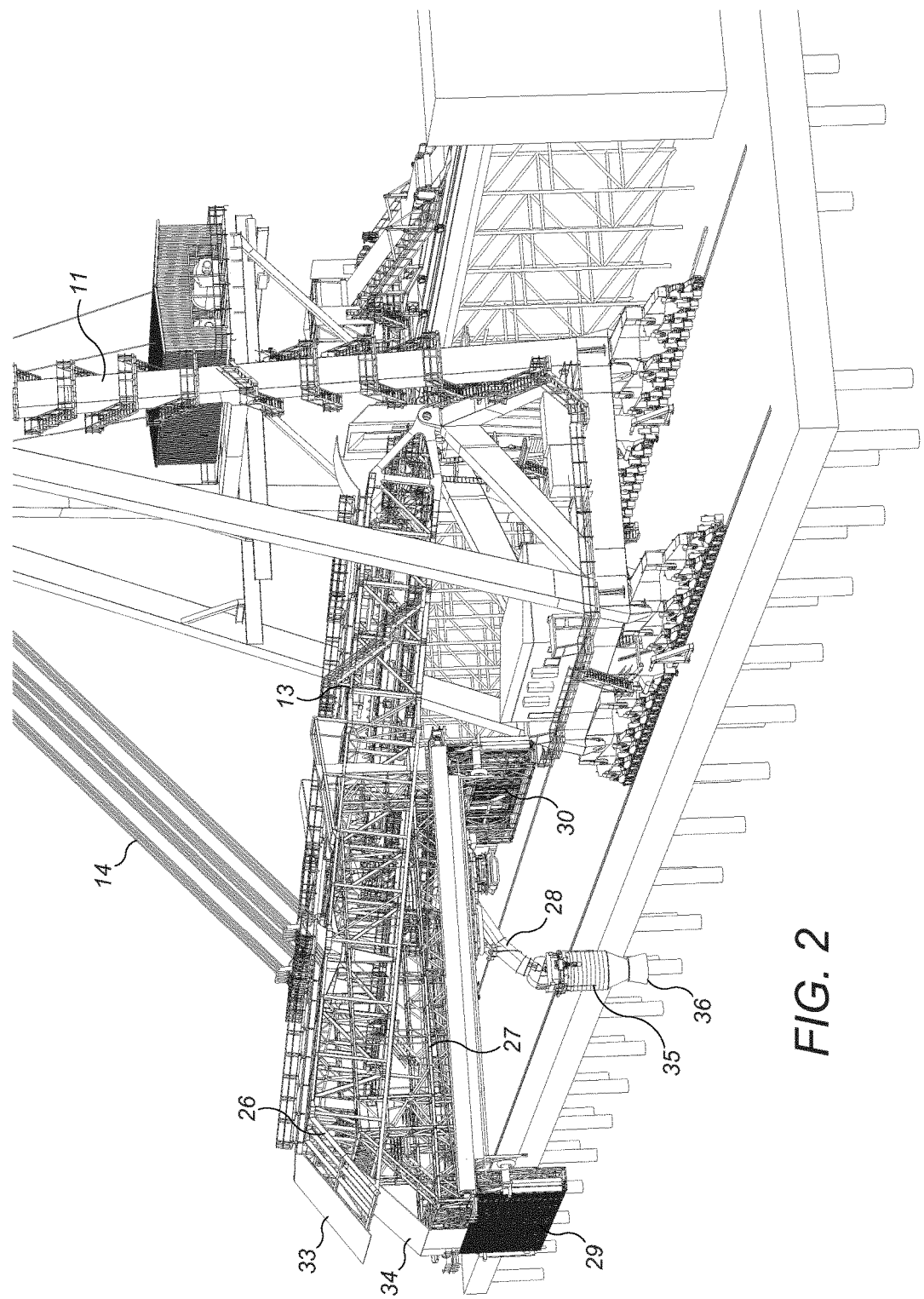
FIG. 2 is a further perspective view of the loading assembly of FIG. 1 with a cover section positioned at a distal end of a boom removed for illustrative purposes.

Referring to FIGS. 1 to 8, a loading assembly 10 comprises a mainframe 11 moveably mounted upon a support structure in the form of a pier 12 suspended above the sea 31. Frame 11 is upstanding and comprises a generally A-frame configuration. A lower or base region 21 of frame 11 mounts a plurality of wheeled bogies 22 each carrying a plurality of wheels 23 to enable frame 11 to move linearly along a pair of parallel tracks 84 extending along pier 12. Frame 11 is configured to move linearly along pier 12 with respect to a gantry 19 that extends linearly to a rearward side of tracks 84. Gantry 19 supports at its upper linear end a shuttle car 20 that carries a conveyor to transport bulk material from a stock pile at pier 12 onto the loading assembly 10.

The assembly 10 further comprises a boom 13 formed from an interconnected open truss structure having a proximal end 24 and a distal end 26. Proximal end 24 is pivotally mounted at a mid-height region of frame 11 via pivot mount 76. A plurality of ropes or cables 14 are attached via sheaves 15 to boom 13 and corresponding sheaves 16 located at an apex region of frame 11. Ropes 17 extend from frame sheaves 16 and are coupled to suitable winches located within winch house 18. Accordingly, boom 13 is capable of being raised and lowered via cables 14, ropes 17 and the winches.

Boom distal end 26 comprises a cover 33 in the form of panel-like cladding that surrounds the lateral sides, the distal tip and roof part 32 to provide a box like structure having an internal enclosed region or cavity 77 being open at it downward facing side. A head part indicated generally by reference 27 is suspended below distal end 26 and is pivotally or hingably mounted at distal end 26 via a mounting arrangement described with reference to FIGS. 8 to 12. Head part 27 is accordingly configured to pivot relative to distal end 26 such that an orientation of head part 26 is adjustable relative to boom 13 to maintain head part 27 in a substantially horizontal position when boom 13 is raised and lowered to be inclined and declined relative to the horizontal and pier 12.

Figure 13:
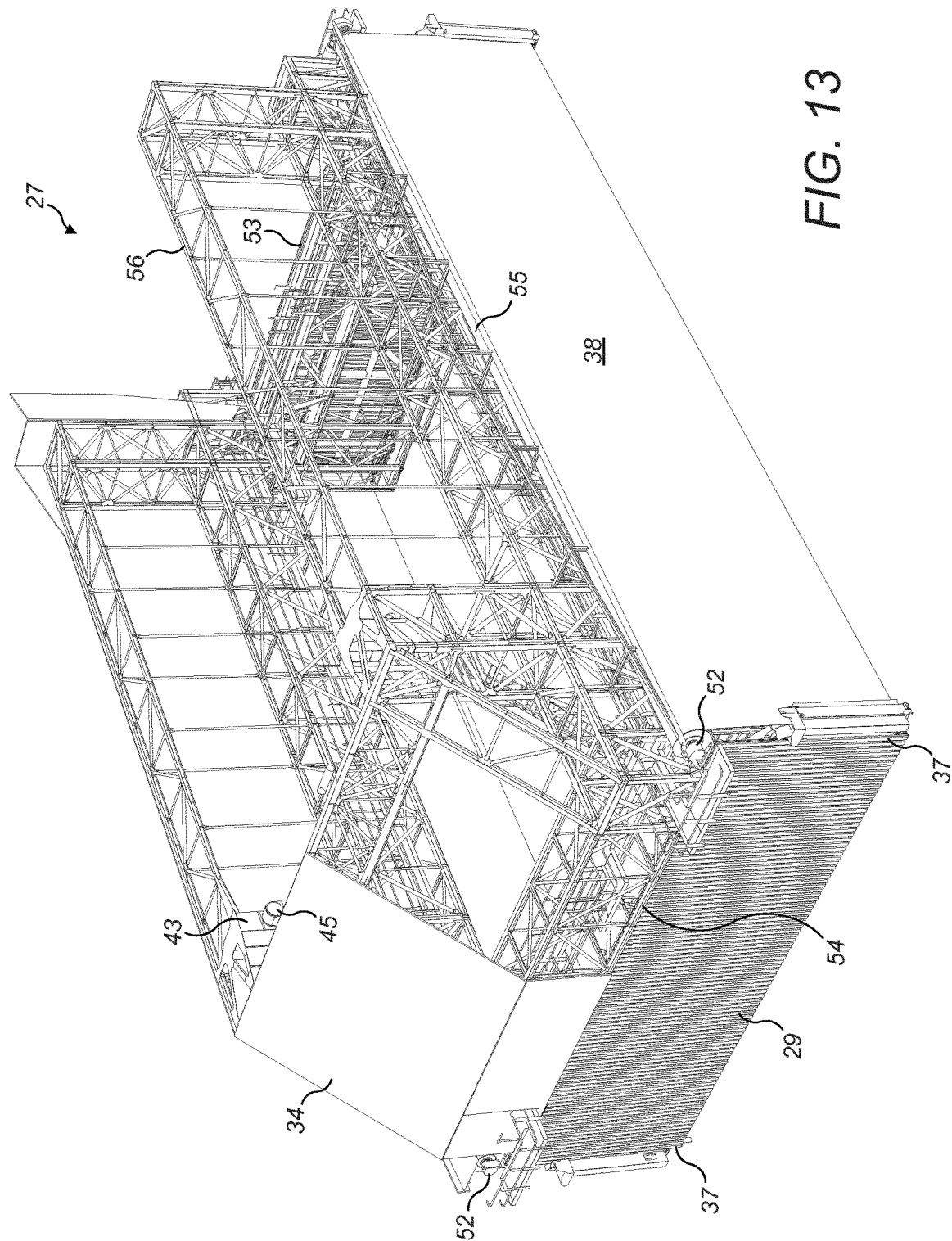
FIG. 13 is a perspective view of the hingably mounted head part of FIG. 1.

Head part 27 comprises a front wall 29 that projects downwardly from a forwardmost end 54 and a back wall 30 that projects downwardly from a rearward end 53 referring to FIG. 13. Each wall 29, 30 is spaced apart by substantially a full length of head part 27 between ends 54 and 53. Head part 27 is formed generally by a lattice framework 56 having a box like structure. Head part 27 further comprises a cover 34 formed from the same plate like cladding as distal end cover 33. Accordingly, the head part cover 34 is configured to form an extension of the distal end cover 33 such that the fixed and movable distal end region of boom 13 (comprising parts 26 and 27) is covered or concealed by cladding at the front, rear, sides and roof.

Figure 3:
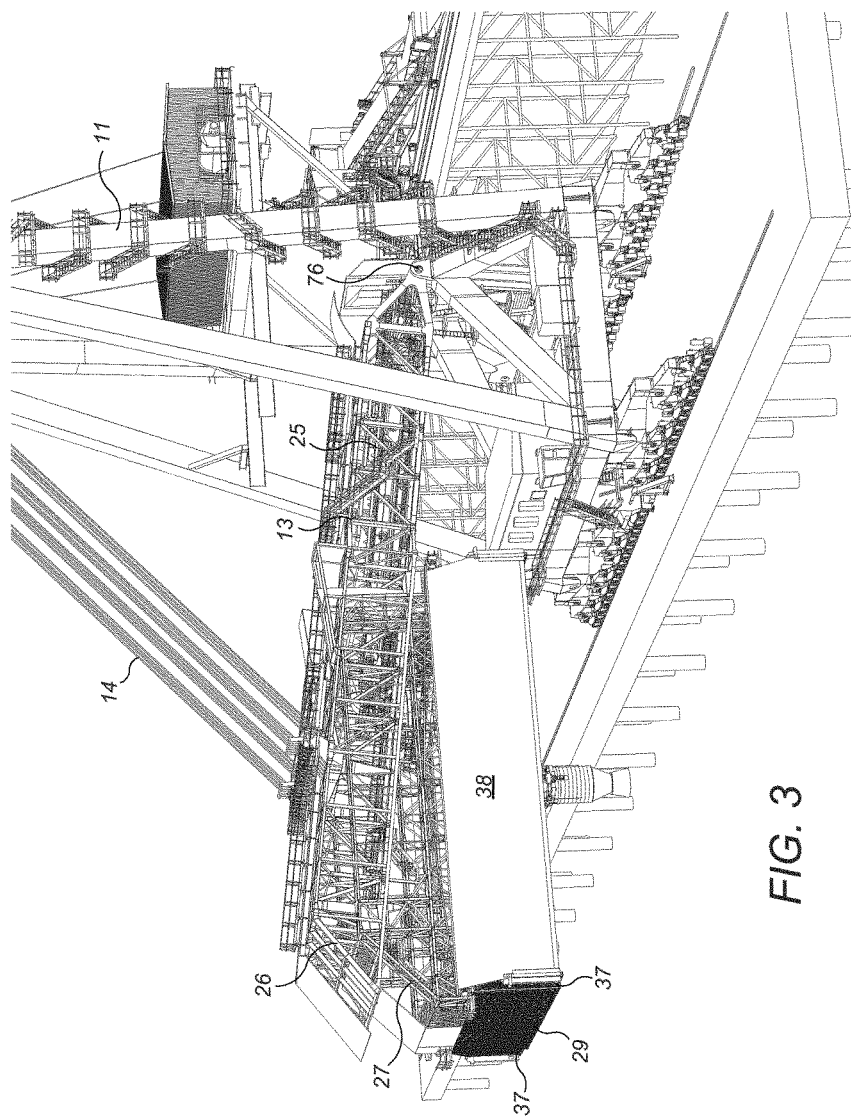
FIG. 3 is a further perspective view of the assembly of FIG. 2.
Figure 4:
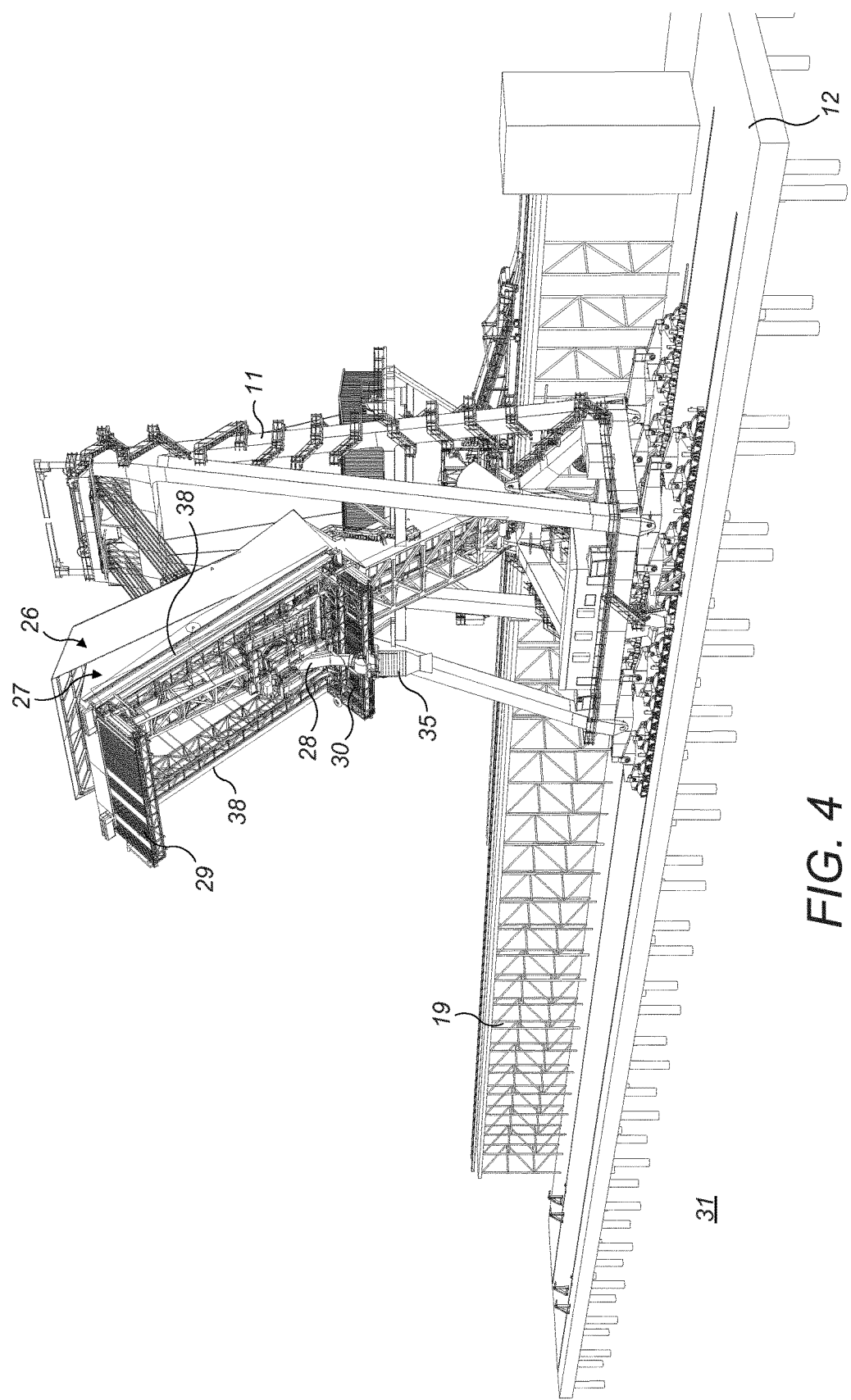
FIG. 4 is a further perspective view of the assembly of FIG. 3 with the boom arm in a raised position.
Figure 6:
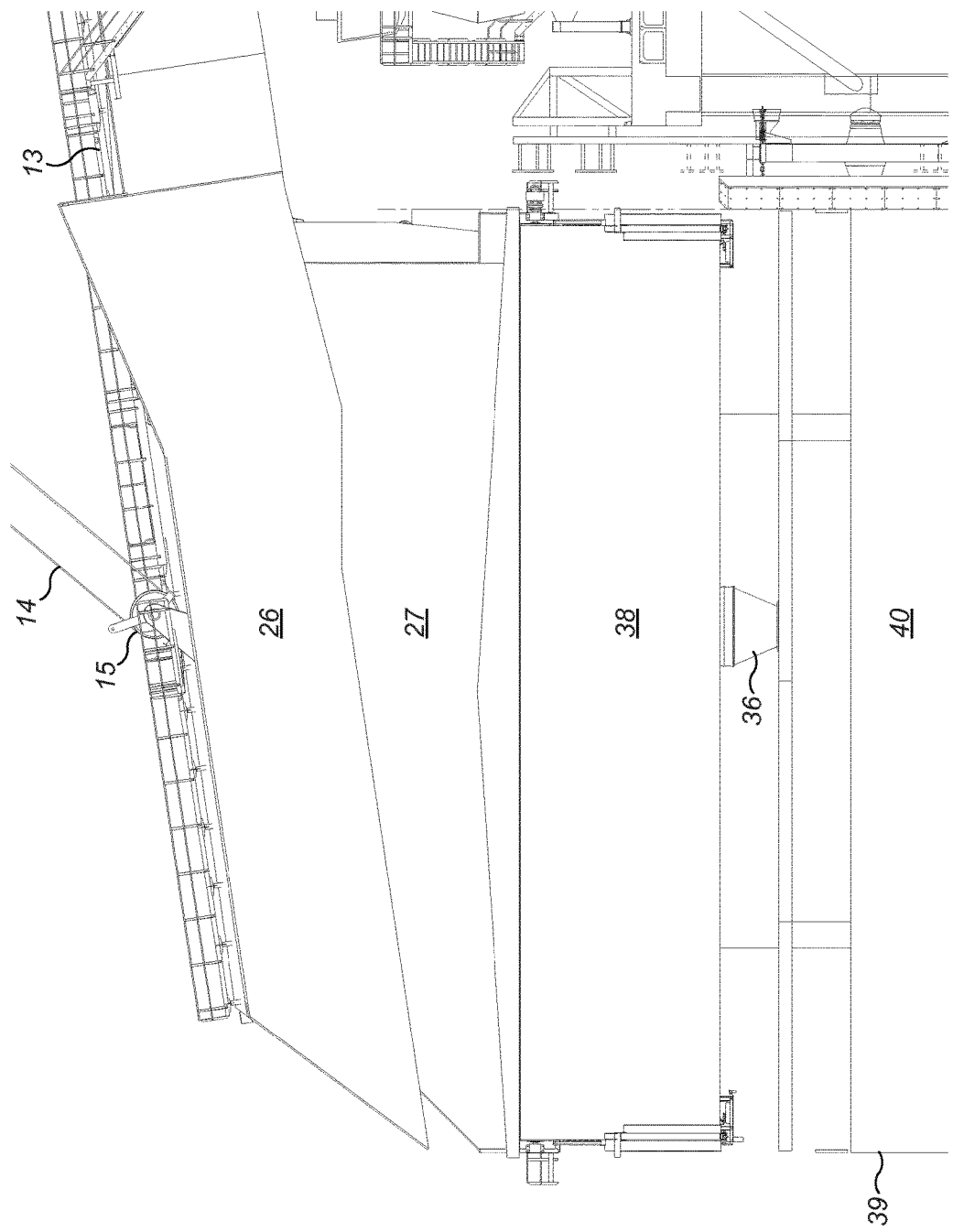
FIG. 6 is an end view of the vessel of FIG. 5 in position below a discharge end of the boom of the assembly.
Figure 7A:
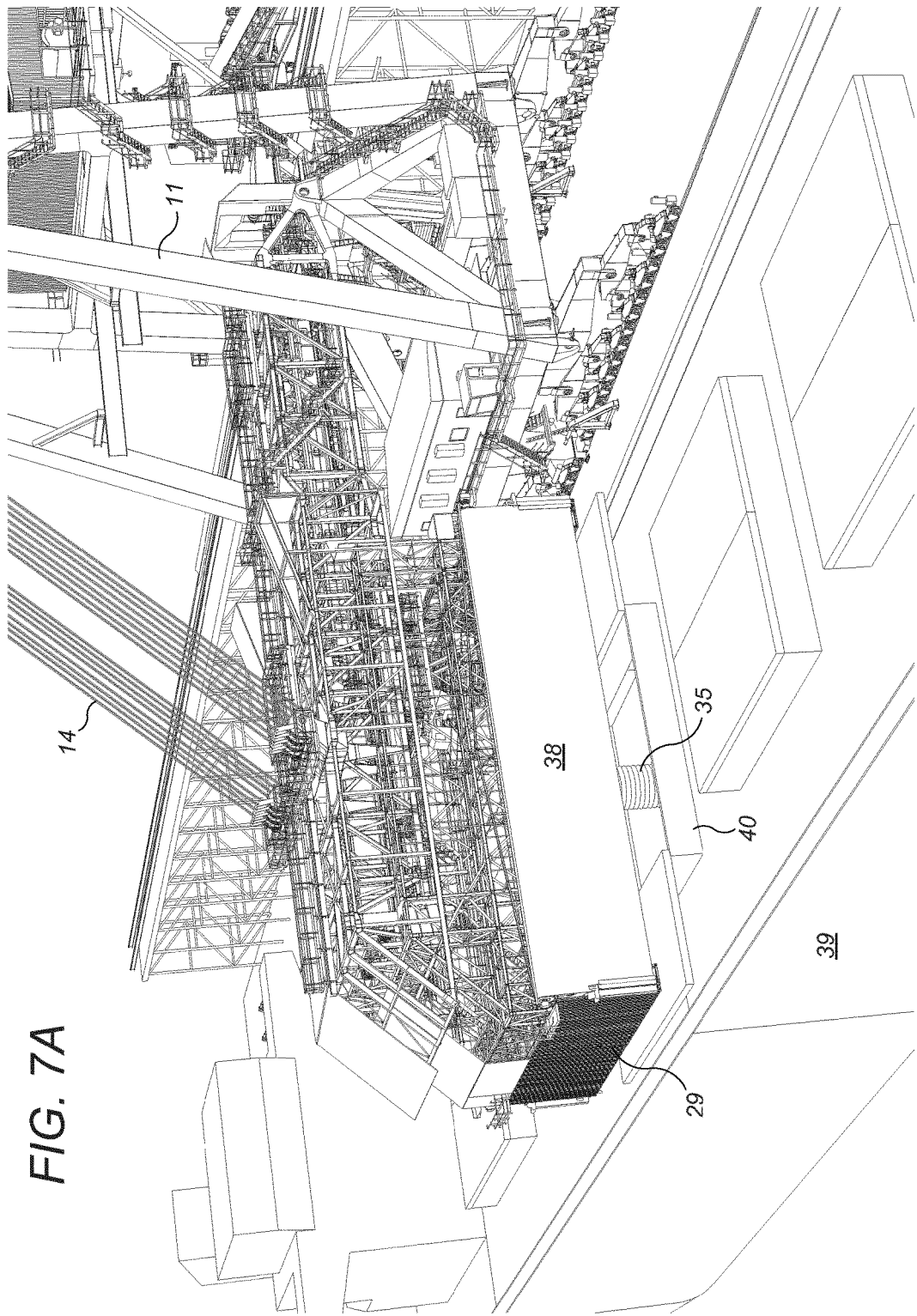
FIG. 7a is a further perspective view of the discharge end of the boom in position over the vessel of FIG. 5.
Figure 7B:
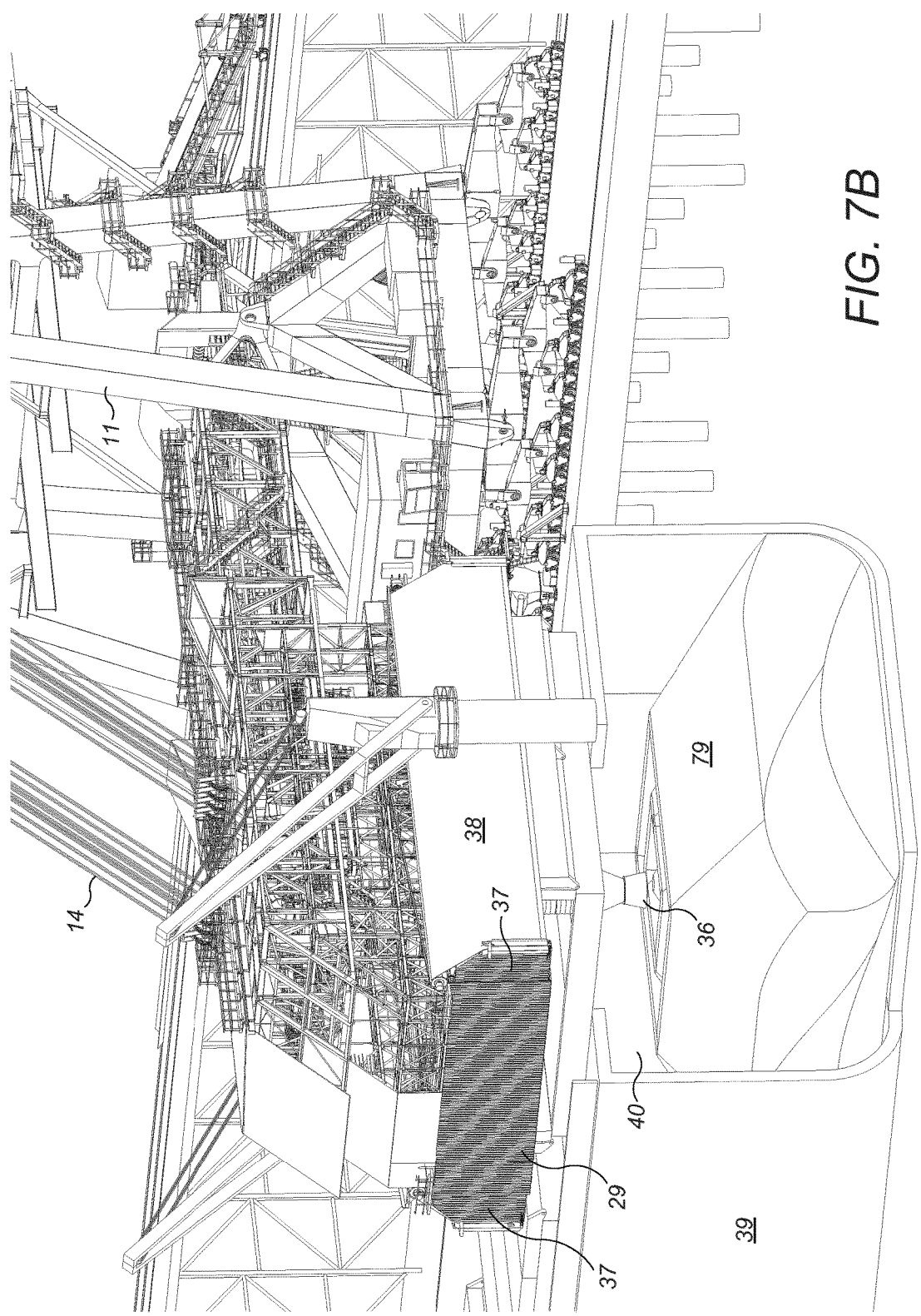
FIG. 7b is a partial cut-away perspective view of a cargo hold within the vessel being filled with bulk material from the assembly.
Figure 9:
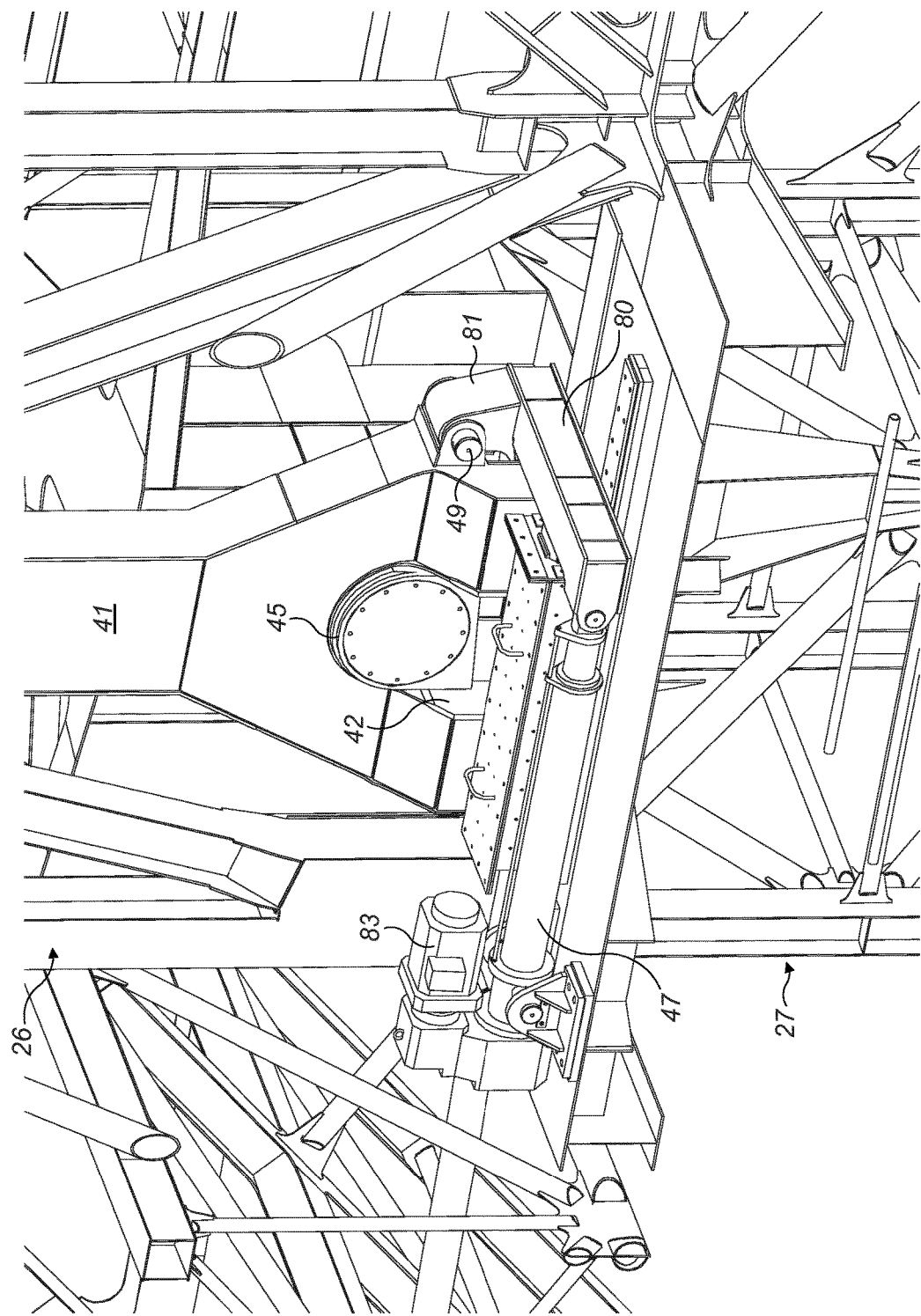
FIG. 9 is a magnified perspective view of a mounting region of the head part and the boom distal end of FIG. 8.
Figure 15:
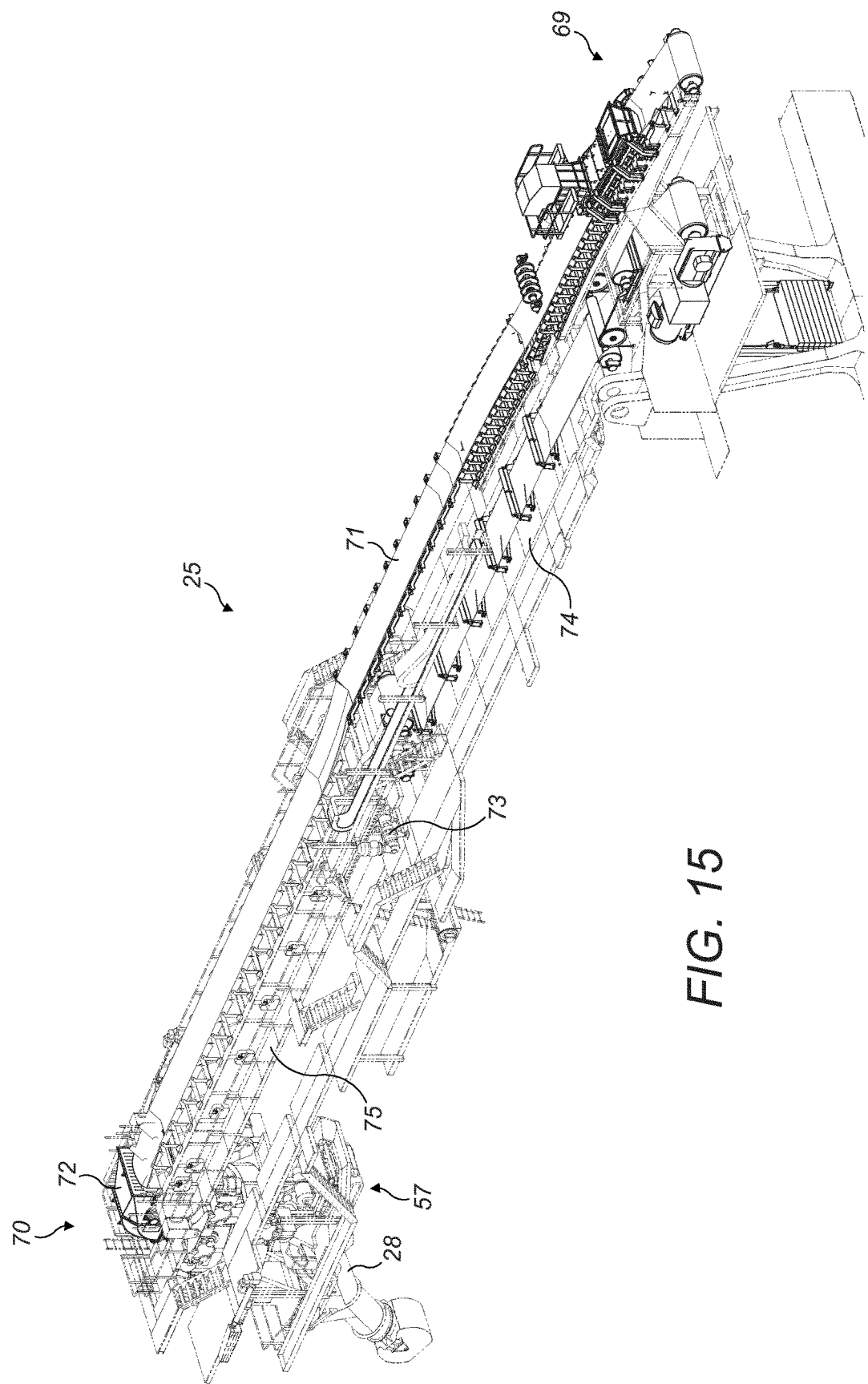
FIG. 15 is a perspective view of a supply chute extending along an upper region of the boom of FIG. 1.

Referring to FIGS. 3 and 15, a supply chute indicated generally by reference 25 extends longitudinally along boom 13 in direction from proximal end 24 to distal end 26. Chute 25 comprises a conveyor belt 71 extending between a first end 69, mated with tripper car 20 and a second end 70 that mounts a slewing mechanism 57. Conveyor 71 is configured to transport the bulk of material for loading into a cargo transporter being received from the tripper car 20. Chute 25 may be considered to comprise two primary components being a first part 74 and a second part 75 (referred to as a shuttle part). Conveyor 71 is configured to be adjustable between ends 69 and 70 as shuttle part 75 is configured to be movable linearly relative to part 74 that is mounted rigidly at boom 13. A discharge port 72 forms a distal end of conveyor 71 and is positioned at end 70 immediately above loading chute 28. A linear actuator mechanism 73 (implemented as a rack and pinion) is mounted at the junction between parts 74 and 75 and is configured to adjust the relative position of the port 72 in a direction along the length of boom 13 between proximal and distal ends 24, 26 via the sliding movement of shuttle part 75 relative to part 74.

Figure 16:
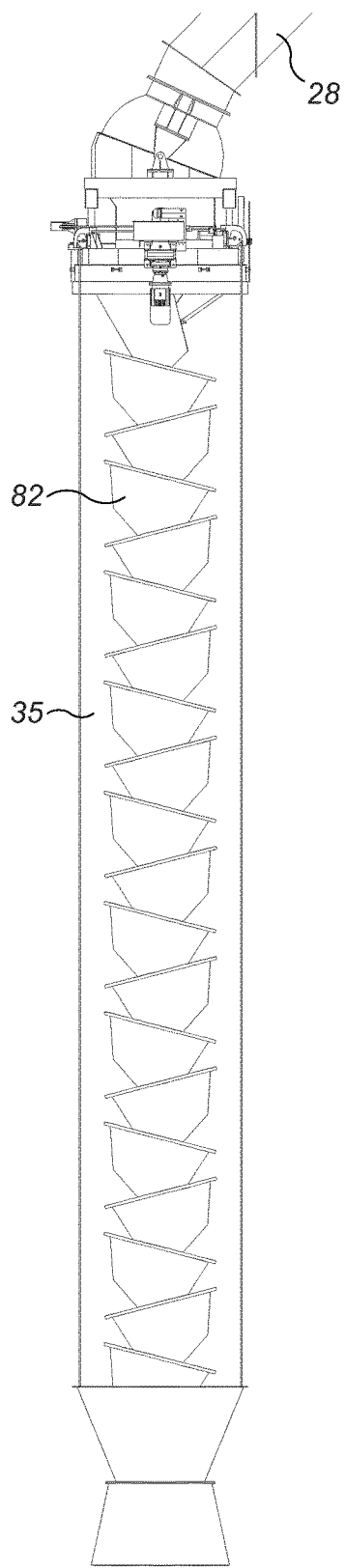
FIG. 16 is a side view of a region of the discharge chute of FIG. 1 suspended from the distal end of the boom.

Loading assembly 10 further comprises a loading chute 28 positioned in communication with supply chute 25 and through which bulk material may be transferred when being loaded onto a cargo transporter. Loading chute 28 comprises a collapsible extension 35 formed from a plurality of concentric funnels 82 (referring to FIG. 16) that may be raised and lowered relative to chute 28 so as to raise and lower a discharge end 36 to and from a cargo hold 40 of a cargo transporter 39 referring to FIG. 5.

Head part 27 further comprises a pair of side curtains 38 that are rolled around a pair of respective drive spools 52 extending lengthwise along the sides 55 of head part 27 between ends 54 and 53. Each drive spool 52 is capable of rotation to raise and lower the flexible curtains 38 relative to distal end 26. Accordingly, curtains 38 when deployed in the lowered position as shown in FIG. 3 are configured to extend between the front and back walls 29 and 30 to completely enclose the region surrounding loading chute 28. Such an arrangement is advantageous to avoid wind and rain ingress into the loading region between head part 27 and cargo hold 40. The curtains 38 are stabilized by a counter weight at the bottom edge of each curtain 38 that keeps the curtains 38 stable during operation in windy conditions.

Figure 10:
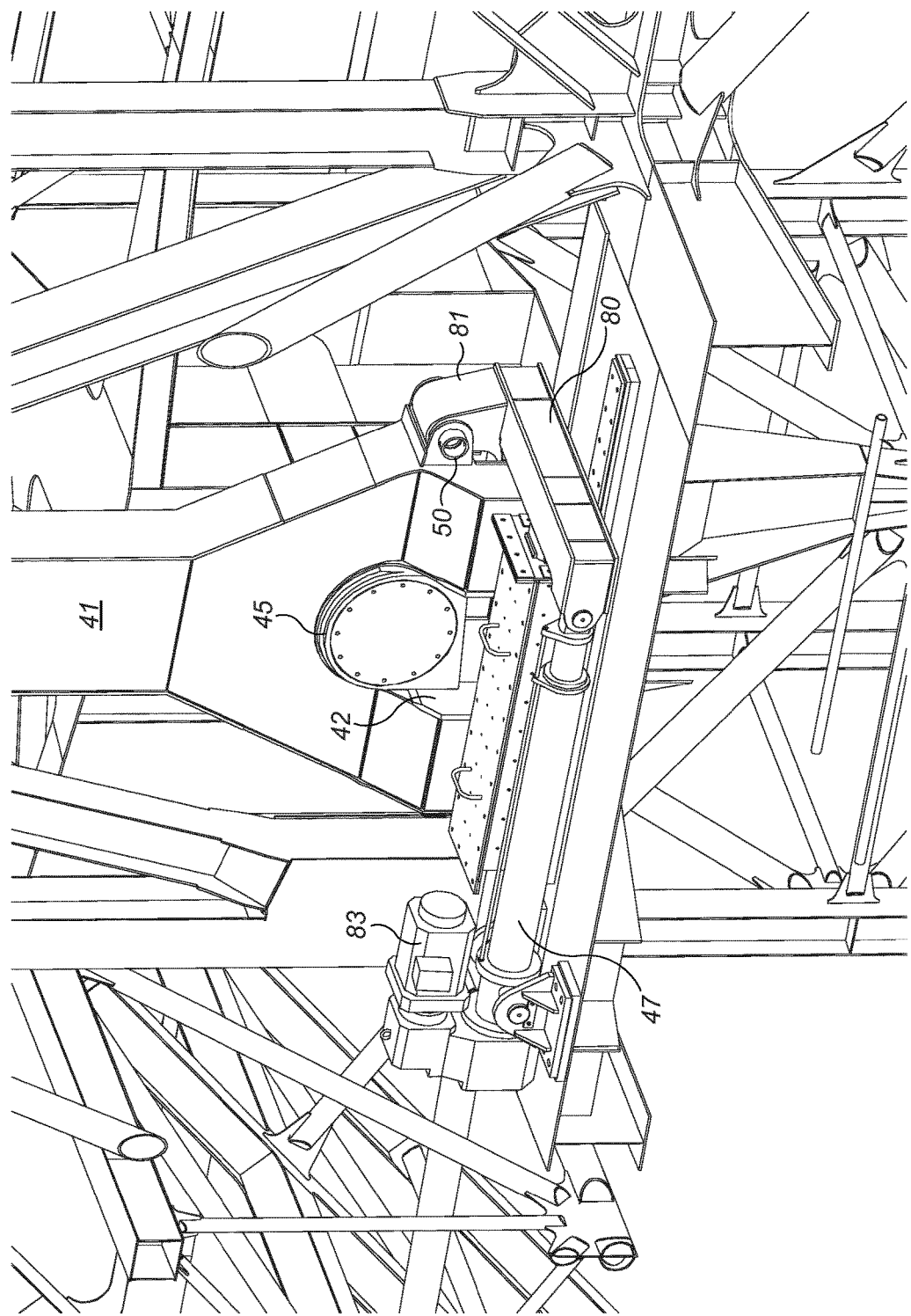
FIG. 10 is a further perspective view of the mounting region of FIG. 9.
Figure 11:
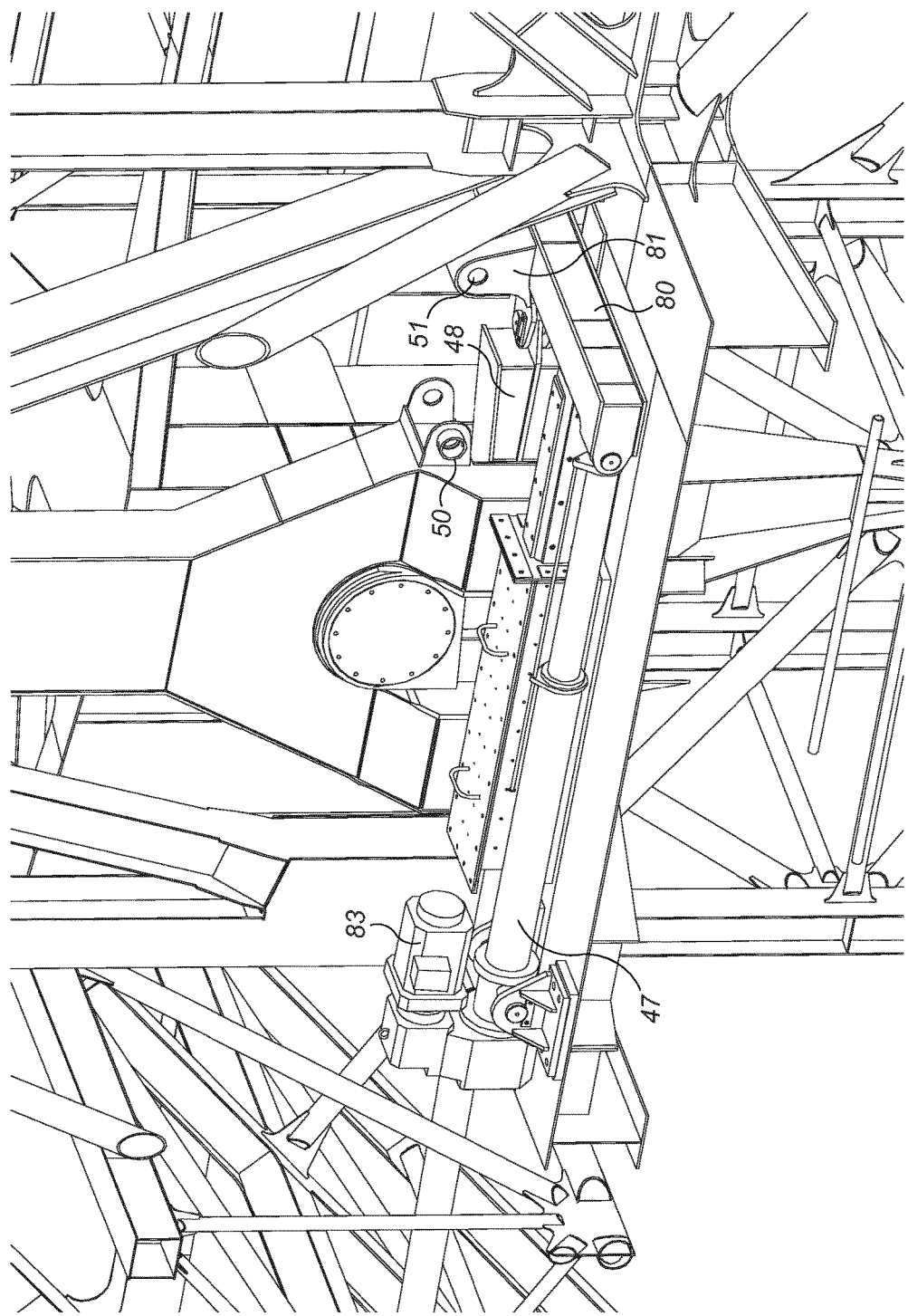
FIG. 11 is a further perspective view of the mounting region of FIG. 10.
Figure 12:
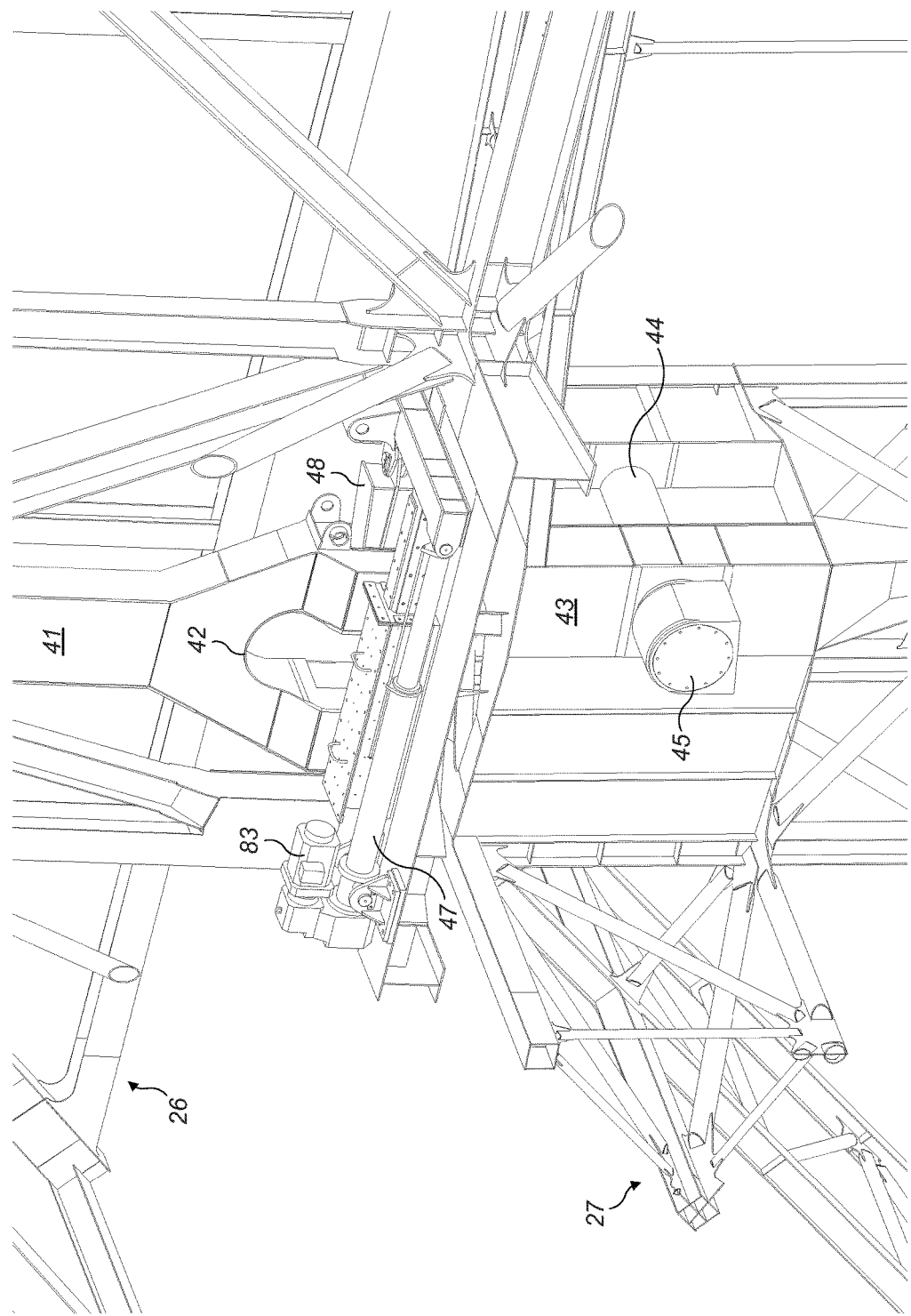
FIG. 12 is a further perspective view of the mounting region of FIG. 11.

Referring to FIGS. 8 to 12, head part 27 is pivotally mounted so as to be suspended from an underside region of distal end 26 via a pair of hinge mountings. In particular, head part 27 comprises a pair of mounts 43 spaced apart in the mount 43 comprises a mounting pin 44 having a bearing housing that forms a mounting region 45 exposed laterally to one side of mount 43. An underside of distal end 26 comprises a pair of correspondingly spaced apart mounting struts 41 that project downwardly from a roof region of distal end 26 to a lower region. A lower region of each strut 41 comprises a slot 42 configured to receive each respective pin mounting region 45. Accordingly, head part 27 is suspended from distal end 26 via engagement of the pin mounting regions 45 within slots 42. Mounting regions 45 are locked in position within slots 42 via locking wedges 48 that are capable of sliding linearly to close a lower region of slot 42 so as to lock mounting regions 45 within an upper region of each slot 42. Each wedge 48 is moved linearly into engagement below each regions 45 via a linear actuator 47 driven by a suitable motor 83. With the wedges 48 engaged in position as shown in FIG. 10, a respective locking pin 49 is accommodated within a bore 50 extending through a lower region of each strut 41 to one side of slot 42. A corresponding bore 51 is formed within a flange 81 upstanding from a link beam 80 that connects each respective wedge 48 to each respective actuator 47 such that locking pin 49 forms a common attachment pin to hold wedges 48 in position immediately below mounting region 45. As illustrated in FIGS. 9 to 12, head part 27 may be conveniently released from distal end 26 via retraction of wedges 48 via actuators 47 after an initial removal of pins 49 from bores 50 and 51. The entire head part 27 may then be lowered and optionally interchanged for a different head part to suit the shape and design configuration of different cargo holds 40 and vessels 39.

Loading assembly 10 further comprises a head part levelling mechanism indicated generally by reference 68 referring to FIG. 5. Levelling mechanism 68 comprises one or a plurality of winches acting between distal end 26 and head part 27 positioned at head part end 53 being at the opposite end relative to pivot mounting 45, 41. Levelling mechanism 68 is configured to automatically adjust the angular orientation of head part 27 relative to boom 13 such that head part 27 may be maintained in a substantially horizontal position independently of the inclined or declined orientation of boom 13 at frame 11. Such an arrangement is advantageous to ensure head part 27 mates in a linear fashion against cargo hold 40 to ensure side curtains 38 and walls 29, 30 are sealed against cargo hold 40 to prevent rain and wind ingress.

Additionally, the front and back walls 29, 30 each further comprise respective side wings 37 that form linear lengthwise extensions of each wall 29, 30. Each wing 37 is configured when fully extended to mate against a lengthwise end of each curtain 38 so as to completely seal and enclose the region around the loading chute 28. Each wing 37 is driven by a wing drive (not shown) mounted immediately above each respective wall 29, 30, optionally in the form of a linear actuator, as will be appreciated by those skilled in the art. Wings 37 may be formed of the same material as walls 29, 30 and may be rigid. Alternatively, wings 37 may be flexible and comprise a similar material to the flexible curtains 38.

Figure 14:
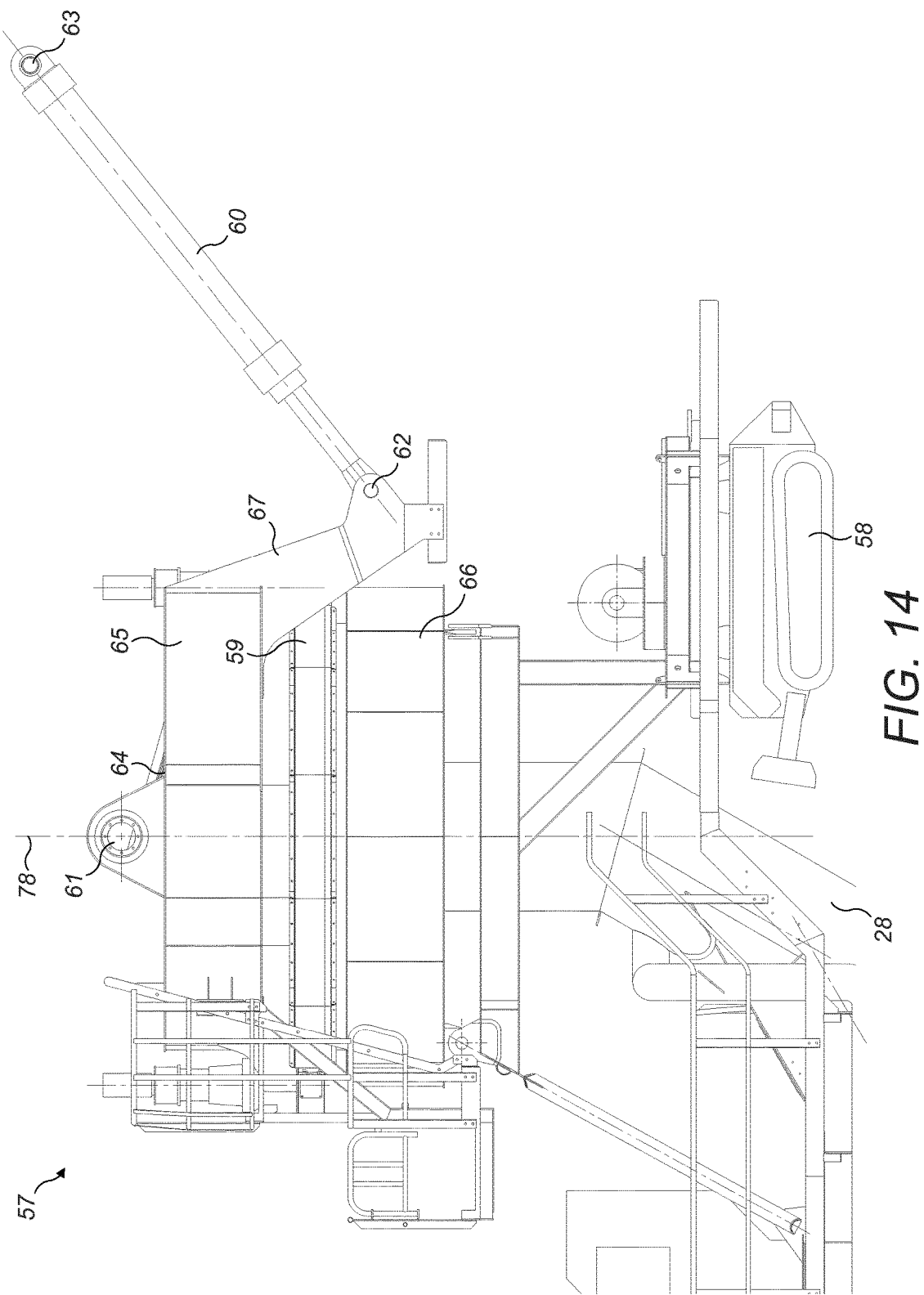
FIG. 14 is an end view of a slewing assembly mounting a discharge chute at the boom of FIG. 1.

Loading chute 28 is movably mounted at distal end 26 via a slewing mechanism indicated generally by reference 57. Mechanism 57 is also configured to move linearly along boom 13 in a direction between ends 26 and 24 via the linear sliding movement of part 75 relative to part 74 as detailed with reference to FIG. 15 using the rack and pinion mechanism 73. Referring to FIG. 14, slewing mechanism 57 comprises an upper annular shell 65 pivotally mounted to suspend a lower annular shell 66 via an intermediate slew bearing 59. Upper shell 65 comprises a pair of outwardly and downwardly projecting arms 67. Both shells 65, 66 comprise a generally annular configuration such that shell 66 is capable of slewing relative to shell 65. Loading chute 28 extends centrally within shells 65 and 66 and slew bearing 59. The majority of the length of loading chute 28 projects downwardly from the central region of lower shell 66 whilst an upper open end 64 is positioned at an upper region of upper shell 65. Accordingly, the material is capable of falling under gravity from the supply chute end 70 and into loading chute open end 64. Chute 28 is generally curved along its length in a vertical direction such that the discharge end 36 is configured to slew radially about slewing axis 78 that is aligned substantially vertically to extend downwardly below head part 27 that is maintained in a generally horizontal position below distal end 26. Slewing mechanism 57 further comprises a remote operative dozer 58 that may be loaded into cargo hold 40 during bulk material loading to distribute evenly the material 79 within hold 40.

Slewing mechanism 57 is mounted at distal end 26 via a pivot mounting 61 and a pair of linear actuators 60. Each actuator 60 comprises a first end 63 attached to part 75 at end region 70 whilst a second actuator end 62 is mounted at one end of each upper shell arm 67. Each actuator 60 is configured to provide automatic levelling of the slewing mechanism 57 at part 75 such that the slewing axis 78 is maintained in a substantially vertical orientation independently of the inclined or declined angle of boom 13. That is, upper shell 65 that suspends lower shell 66 and loading chute 28 is pivotally mounted at end 70 of part 75 via the pair of pivot mountings 61 and actuators 60.

The invention claimed is:

1. A cargo transporter loading assembly for loading bulk material onto a cargo transporter, the assembly comprising:
   an upstanding support frame mountable on land or a support structure;
   a boom pivotally mounted and projecting outwardly from the frame, the boom having a proximal end positioned at the frame and a distal end capable of being raised and lowered relative to the frame;
   a chute arrangement to transport the bulk material along the boom to the distal end;
   a first cover extending over the distal end;
   a pivoting head part pivotally attached to be suspended below the distal end having a second cover to form a downward extension of the first cover for positioning immediately above the cargo transporter to be loaded with the bulk material, wherein the head part is arranged to pivot below the distal end and be maintained at an angled orientation relative to the boom; and
   a front wall projecting downwardly from the head part at a location furthest from the frame relative to a back wall projecting downwardly from the head part at a spaced apart location from the front wall.

2. The assembly as claimed in claim 1, further comprising at least one flexible curtain positioned to be lowerable to extend between the front and back wall.

3. The assembly as claimed in claim 2, further comprising a pair of flexible curtains, each curtain positioned to be capable of projecting downwardly from the head part to extend between the front and back wall such that the front wall, the back wall and the curtains define an enclosed region below the head part.

4. The assembly as claimed in claim 3, wherein the front and back wall include respective pairs of retractable wings to extend towards and away from the curtains.

5. The assembly as claimed in claim 3, further comprising at least one curtain drive mechanism to actuate raising and lowering the curtains to project downwardly from the head part.

6. The assembly as claimed in claim 1, wherein the front and/or back wall are movably mounted at the head part.

7. The assembly as claimed in claim 1, wherein the front and back wall are substantially rigidly mounted at the head part.

8. The assembly as claimed in claim 1, further comprising a mounting assembly arranged to pivotally mount the head part at the distal end.

9. The assembly as claimed in claim 8, wherein the mounting assembly includes a mounting pin connecting the distal end of the boom and the head part.

10. The assembly as claimed in claim 9, wherein the mounting assembly includes a mount frame having a slot provided at the distal end and a wedge movably mounted via an actuator to open and close the slot, wherein the mounting pin is provided at the head part and releasably engaged within the slot and locked by the wedge.

11. The assembly as claimed in claim 1, further comprising a levelling mechanism configured to control an orientation of the head part relative to the boom so as to maintain a desired angle of orientation of the head part relative to the boom.

12. The assembly as claimed in claim 1, further comprising a loading chute mounted at the distal end having a downwardly projecting section through which the bulk material is capable of falling and a slewing mechanism rotatably mounting an upper region of the loading chute at or towards the distal end to allow the downwardly projecting section to rotate so as to provide adjustment of a position of a lower region of the loading chute to discharge the bulk of material to different locations at the cargo transporter.

13. The assembly as claimed in claim 12, further comprising a translation mechanism mounting the loading chute at the distal end such that the loading chute is arranged to move in a direction along the length of the boom between the proximal and distal ends.

14. The assembly as claimed in the claim 13, wherein the translation mechanism includes a rack and pinion arrangement.

15. The assembly as claimed in claim 12, wherein a region of the downwardly projecting section is curved along its length.

16. The assembly as claimed in claim 12, wherein the slewing mechanism includes an upper shell and a lower shell coupled via an intermediate slew bearing such that the lower shell is capable of slewing relative to the upper shell and wherein the loading chute is mounted to the lower shell.

17. The assembly as claimed in claim 16, wherein the upper shell is mounted at the boom via a slewing levelling mechanism configured to maintain at least a region of the slewing mechanism in a substantially horizontal arrangement, such that an axis about which the loading chute is capable slewing is maintained in a substantially vertical alignment.

18. A cargo transporter loading assembly for loading bulk material into a cargo transporter, the assembly comprising:
   an upstanding support frame mountable on land or a support structure;
   a boom pivotally mounted at and projecting outwardly from the frame, the boom having a proximal end positioned at the frame and a distal end arranged to be raised and lowered relative to the frame;
   a supply chute arrangement arranged to transport bulk material along the boom to the distal end;
   a loading chute mounted at or towards the distal end having a section to project downwardly from the distal end, the loading chute configured to receive material from the supply chute;
   a first cover extending over the distal end;
   a pivoting head part pivotally attached to be suspended below the distal end having a second cover to form a downward extension of the first cover for positioning immediately above the cargo transporter to be loaded with the bulk material, wherein the head part is arranged to pivot below the distal end and be maintained at an angled orientation relative to the boom;
   a mounting assembly arranged to pivotally mount the head part at the distal end; and
   a slewing mechanism rotatably mounted to the loading chute at or towards the distal end, such that the loading chute is capable of slewing about an axis that projects downwardly from the distal end to enable adjustment of a position of a lower region of the loading chute relative to the distal end.

19. The assembly as claimed in claim 18, further comprising a slewing levelling mechanism configured to maintain at least a region of the slewing mechanism in a substantially horizontal arrangement, such that an axis about which the loading chute is capable of slewing is maintained in a substantially vertical alignment.

20. The assembly as claimed in claim 18, further comprising a translation mechanism mounting the loading chute at or towards the distal end, such that the loading chute is arranged to move in a direction along the length of the boom between the proximal and distal ends.

21. The assembly as claimed in claim 18, wherein the section of the loading chute that projects downwardly from the distal end is curved along its length in a downward direction.

\* \* \* \* \*